Sept. 24, 1957  J. M. CUNNINGHAM ET AL  2,807,418
VEHICLE REGISTERING DEVICE

Filed July 10, 1952  2 Sheets-Sheet 1

INVENTORS
JAMES M. CUNNINGHAM
KENNETH E. RHODES
BY
John B. Sponsler
AGENT

INVENTORS
JAMES M. CUNNINGHAM
KENNETH E. RHODES
BY
AGENT

United States Patent Office 2,807,418
Patented Sept. 24, 1957

2,807,418

VEHICLE REGISTERING DEVICE

James Mason Cunningham and Kenneth E. Rhodes, Endicott, N. Y., assignors to International Business Machines Corporation, New York, N. Y., a corporation of New York Application July 19, 1952, Serial No. 298,086

6 Claims. (Cl. 235—99)

This invention relates to electrically operated registers adapted to the counting of vehicles passing over a predetermined location of a vehicular highway.

More particularly this invention relates to a highway toll register system wherein vehicles pass over and actuate electrical contacts embedded in the highway to form a treadle switch, such switches being well known in the art as exemplified in U. S. Patents 2,166,090 and 2,251,351.

Ordinarily treadle switches are so located in toll highway systems to provide accurate registration of the vehicles passing over the highway, switches being installed so that erroneous registrations are prevented due to the rolling back or the passing over the treadle switch by a vehicle moving in the reverse direction. Frequently, however, these error-preventing arrangements are insufficient, particularly where the treadle switch is located in a highway lane of sufficient width so that a vehicle may pass over the treadle at an angle whereby one wheel of an axle passes completely over the switch before another wheel encounters the switch, thereby causing duplicate and erroneous registrations.

In the present invention a new arrangement is provided wherein the treadle switch comprises two or more sections, each section having two contacts operated in a sequence determined by the direction of travel of the vehicle. Furthermore, the two contacts of each section are arranged so that the second contact in the sequence closes at least before the first contact reopens, and the first contact reopens before the second contact reopens when a vehicle axle passes completely over the treadle switch.

It is therefore an object of this invention to provide an improved treadle switch and circuits therefor for maintaining an accurate count of the net number of vehicle axles passing over a treadle switch in a specified direction regardless of the angle of axle approach; that is, the angle with which a wheel encounters the treadle switch.

It is another object of this invention to provide a treadle switch and circuits the condition of which is a function of the net number of axles passing over the treadle in a specified direction.

It is a further object of this invention to provide circuits in a highway registration system which maintain an accurate record of the number of axles passing over a treadle switch in each direction.

A still further object of this invention is to provide circuits having a condition which is a function of the number of axles passing over a treadle in each direction.

Another object of this invention is to provide a vehicle registering device wherein the passage of a single wheel of an axle over a treadle switch is ineffective to cause a registration.

Other objects and advantages of the invention will become apparent from the description which follows and which is illustrated by the accompanying drawings, the invention being further defined by additional features hereinafter set forth and claimed.

Figure 1:
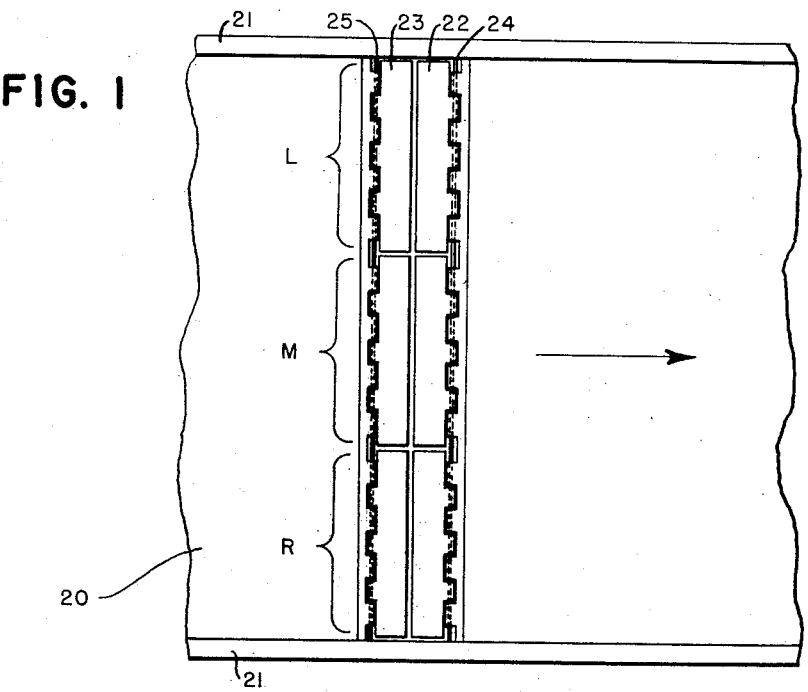
Fig. 1 is a diagrammatic, plan view of a sectionalized treadle switch embedded in a highway lane over which traffic moves forward in the direction indicated by the "arrow."
Figure 2:
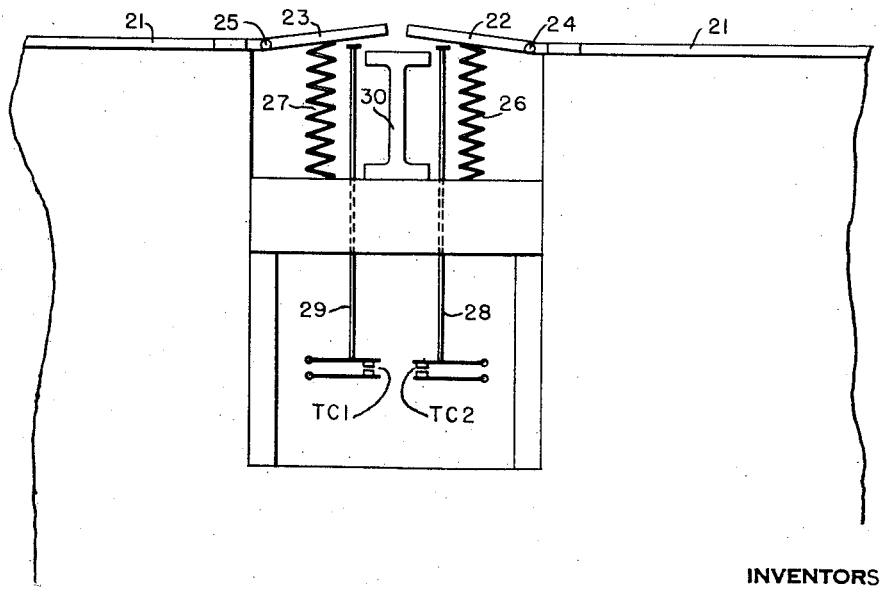
Fig. 2 is a diagrammatic, sectional view of one of the three similar sections of the treadle switch of Fig. 1.

Referring to Fig. 1, a section of a highway traffic lane 20 is shown bounded by the curbs 21, between which, and located traversely with respect to the direction of the lane 20, is embedded a treadle switch comprising respectively three (3) sections, L, M, and R. Each section consists of two (2) bearing plates 22 and 23, hinged respectively at pivot centers 24 and 25 (see also Fig. 2). The plates 22 and 23 are of sufficient size and construction to support the proportionate weight of any vehicle contemplated passing over the highway, and each plate is normally biased upwards on its pivot by a spring capable of lifting the plate. For example, see Fig. 2, bearing plate 22 is biased by a spring 26 and bearing plate 23 is biased by a spring 27.

Associated with each bearing plate is a push rod, which in turn coacts with a pair of normally open contacts, which latter may be of spring strap construction sufficient to retain the contacts open and to support the weight of the push rod. Plate 22 cooperates with push rod 28, which operates the contacts TC–1, and plate 23 cooperates with push rod 29, which operates the contacts TC–2. When the bearing plates 22 and 23 are forced down by the passage of the wheel of an axle of a vehicle over them, their free edges are provided with a supporting member 30 which extends across the width of the lane.

The length (edge to pivot) of the lever arm of each bearing plate 22 and 23 is designed so that the smallest diameter wheel contemplated for passage over the treadle switch will retain the first plate encountered fully depressed until the second plate encountered is fully depressed and so that the largest diameter wheel contemplated for passage over the treadle switch will release the first plate encountered before it releases the second plate encountered.

It is to be further noted that the length of each bearing plate 22 or 23 must not exceed a dimension which would permit all the wheels of any axle of a vehicle to pass over only a single section of the treadle switch.

In normal operation, therefore, as a vehicle passes over the highway lane in the direction indicated by Fig. 1, plate 23 is first depressed and contacts TC–1 become closed by push rod 29. Then, as the wheel of the vehicle progresses, plate 22 becomes depressed, the contacts TC–2 being closed by push rod 28. Thereafter plate 23 is released, the contacts TC–1 opening under the urging of their spring straps, and subsequently, as the vehicle wheel moves forward, the plate 22 is released and contacts TC–2 open in a similar manner. In other words the contacts TC–1 close, followed by the closing of contacts TC–2 with contacts TC–1 remaining closed, then contacts TC–1 open with contacts TC–2 remaining closed, and finally contacts TC–2 open as the wheel of an axle moves over the treadle switch in the forward direction indicated in Fig. 1. When a vehicle wheel passes over the treadle switch in the reverse direction to that indicated in Fig. 1, the contacts TC–1 and TC–2 are closed and opened in the reverse order.

Figure 3:
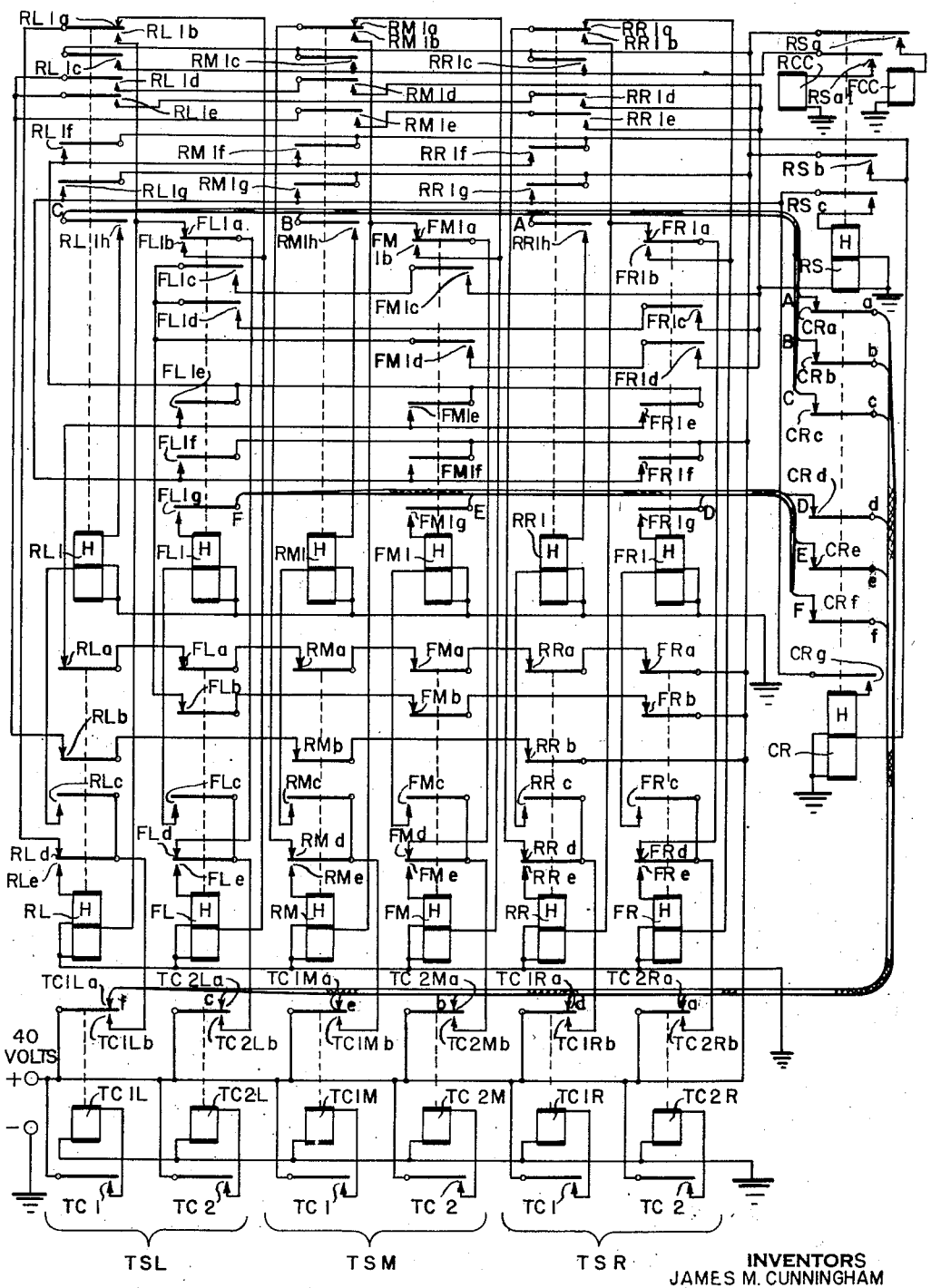
Fig. 3 is a circuit diagram of the invention relative to the circuit connections associated with the treadle switch illustrated in Figs. 1 and 2.

The circuit into which the above described treadle switch is incorporated is shown in Fig. 3, and comprises, for purposes of illustration, circuit connections for a three (3) section treadle switch. This circuit is applicable only to vehicles which have at least two (2)

wheels per axle, and is designed specifically for a three (3) section treadle switch having sections sufficiently narrow so that all the wheels on any one axle can not pass over the same section. Essentially the circuit comprises three (3) identical parts, TSL, TSM, and TSR, each part being associated with a section of the treadle switch. Each of the three (3) parts of the circuit functions in the same manner, and the operation of the complete circuit is hereinafter described principally with reference to that part identified as TSL, the other parts TSM and TSR functioning in a like manner.

Let it is assumed, therefore, that a vehicle axle having two (2) wheels, which pass respectively over the sections TSL and TSR, moves over the treadle switch in the direction indicated in Fig. 1. The contacts TC–1 will thereby be closed in parts TSL and TSR. Now in Fig. 3 referring only to part TSL, a circuit will be established from 40 volt positive power supply via TC–1, relay TC–1L, ground to 40 bolt negative power supply, and relay TC–1L will operate closing contacts TC–1L–b and opening contacts TC–1L–a. A circuit will thereby be established from the 40 volt positive power supply through contacts TC–1L–b, contacts RL–d, contacts RL–1–a, to relay FL, to ground, to the 40 volt power supply, picking up relay FL. As the wheel progresses over the treadle switch the contacts TC–2 are closed, consequently relay TC–2L becomes energized via 40 volt positive supply line, contacts TC–2, relay TC–2L, ground to 40 volt negative supply line. A circuit now is established via 40 volt positive supply line, contacts TC–2L–b, contacts FL–e, holding coil of relay FL, ground to 40 volt negative supply line, holding relay FL energized. Relay FL–1 is also picked up via a circuit from 40 volt positive supply line, contacts TC–2L–b, contacts FL–c, relay FL–1, ground to 40 volt negative supply line.

As the wheel passes on over the treadle switch the contacts TC–1 are opened whereupon relay TC–1L becomes deenergized and a holding circuit is established for relay FL–1 via 40 volt positive supply line, contacts TC–1L–a (f), contacts CR–d (d and D), contacts FL–1–g (F), holding coil of relay FL–1, ground to 40 volt negative supply line.

Finally, as the wheel progresses further over the treadle switch the contacts TC–2 are opened (by release of the bearing plate 22) whereupon relay TC–2L is de-energized and its contacts TC–2L–b open, thereby dropping out relay FL (and leaving relay FL–1 energized as explained above). As has been assumed the relay FR–1 is energized and established energized in a manner identically with that of relay FL–1; consequently, when relay FR drops out both FL–1 and FR–1 relays remain operated and a circuit is established to operate relay RS via 40 volt positive supply line, contacts FR–b, contacts FM–b, contacts FL–b, contacts FL–1–d, contacts FR–1–c, relay RS, ground to 40 volt negative supply line. Operation of relay RS causes a counter magnet FCC to become energized, indicating that one axle has crossed over the treadle switch in the forward direction, via 40 volt positive supply line, contacts RS–a, counter magnet FCC, ground to 40 volt negative supply line.

When relay RS becomes energized its contacts RS–b provide a circuit for energizing relay CR via 40 volt positive supply line, contacts RS–b, relay CR, ground to 40 volt negative supply line. When relay CR is energized its contacts CR–d, CR–e, and CR–f open dropping out relays FL–1 and FR–1 (and FM–1, if energized) thereby returning all circuits to normal.

For purposes of brevity let it be assumed that a single wheel passes normally over the switch R thereby affecting the circuits TSR. When switch contacts TC–1 are made, relay TC–1R is energized via +40, TC–1R, ground, —40. Relay contacts TC–1R–b now close and relay FR is energized via +40, TC–1R–b, RR–d, RR–1–a, relay FR, ground, —40. When switch contacts TC–2 are made, relay TC–2R is energized via +40, TC–2R, ground, —40. Relay contacts TC–2R–b now close, and relay FR is held energized via +40, TC–2R–b, FR–e, relay FR, ground, —40. Also relay FR–1 is energized via +40, TC–2R–b, FR–c, relay FR–1, ground, —40.

When switch contacts TC–1 are opened relay TC–1R is de-energized and contacts TC–1R–a are closed and contacts TC–1R–b are opened. Relay FR–1 is now held energized via +40, TC–1R–a (d), CR–d (d), CR–d (D), FR–1–g (D), relay FR–1, ground, —40. When switch contacts TC–2 are opened (as the wheel clears the switch R), relay TC–2R is de-energized so that contacts TC–2R–a are closed and contacts TC–2R–b are opened whereupon relay FR is de-energize (relay FR–1 remains energized). No circuit can be completed to relay RS unless relay FM–1 or relay FL–1 is also energized together with relay FR–1. Also it is to be noted that relay FR (or its counterparts FM and FL) must be de-energized to enable relay RS to be energized.

Let it be further assumed that the same wheel then reverses and backs over switch R. When switch contacts TC–2 are made the relay TC–2R is energized via +40, TC–2, relay TC–2R, ground, —40. Contacts TC–2R–a are opened and TC–2R–b are closed; however, no circuit can be established to relay RR or relay RR–1 (the reverse counting relays) since relay FR–1 continues energized. When switch contacts TC–1 are made the relay TC–1R is energized via +40, TC–1, relay TC–1R, ground, —40. Contacts TC–1R–a are opened and the relay contacts TC–1R–b are closed. Relay FR–1, which has been held energized by the closed contacts TC–1R–a, is de-energized. At the same time relay FR becomes energized via +40, TC–1R–b, RR–d, RR–1–a, relay FR, ground, —40. Relay FR is then held by a circuit +40, TC–2R–b, FR–e, relay FR, ground, —40. When the switch contacts TC–2 are broken, however, the holding circuit for relay FR is broken, but temporarily held by the "pick up" circuit including relay contacts TC–1R–b (previously described). However when switch contact TC–1 is broken, relay FR becomes de-energized and all circuits return to normal conditions.

Now returning to switch L and circuits TSL when a wheel passes over the treadle switch in reverse direction of that indicated by the "arrow" of Fig. 1 (referring only to circuit part TSL) contacts TC–2 are first closed energizing relay TC–2L as previously described. Relay RL is thereby energized via a circuit from 40 volt positive supply line, contacts TC–2L–b, contacts FL–d, contacts FL–1–a, relay RL, ground to 40 volt negative supply line. Thereafter contacts TC–1 are closed, as the wheel progresses in the reverse direction, and relay TC–1L is energized as before described. A holding circuit is now established for relay RL via 40 volt positive supply line, contacts TC–1L–b, contacts RL–e, holding coil of relay RL, ground to 40 volt negative supply line. At the same time a circuit is established energizing relay RL–1 via 40 volt positive supply line, contacts TC–1L–b, contacts RL–c, relay RL–1, ground to 40 volt negative supply line. Thereafter when the wheel releases plate 22 and contacts TC–2 open, dropping out relay TC–2L, a holding circuit is established for relay RL–1 via 40 volt positive supply line, contacts TC–2L–a (c), contacts CR–a (a and A), contacts RL–1–h (C), holding coil of relay RL–1, ground to 40 volt negative supply line. Relay RR–1 is picked up and held in a similar manner by the action of a wheel passing over section R of the treadle switch.

When the wheel finally passes off bearing plate 23 and contacts TC–1 open, thereby de-energizing relay TC–1L, the holding circuit for relay RL is broken by the opening of contacts TC–1L–b, and since relay RR is deenergized in a similar manner by the opening of contacts TC–1R–b, a circuit is then established to energize relay RS via 40 volt positive supply line, contacts RR–b, contacts RM–b, contacts RL–b, contacts RL–1–e, contacts RR–1–d, relay RS, ground to 40 volt negative supply line. A circuit is now established to energize the reverse count indicator RCC via 40 volt positive supply line, contacts RL–1–c and RR–1–c in parallel, contacts RS–a–1, indicator RCC, ground to 40 volt negative supply line. Counter magnet FCC is energized as previously described via contacts RS–a; however, the count is indicated as a reverse count in view of the indicator RCC being energized. Consequently the count of a vehicle axle which passes all its wheels over the treadle switch in a forward direction and then reverses over the treadle may thereby be nullified or disregarded. As in the preceding example, where the vehicle proceeded only in the forward direction the contacts RS–b energize relay CR whose contacts CR–a, CR–b, and CR–c open thereby dropping out the holding circuits of relays RL–1, RM–1, and RR–1 and restoring all the circuits to normal de-energized conditions.

Since, as any wheel passes over a section of the treadle switch, in the forward direction, for example, with reference to section L and to circuit part TSL:

1. Relay TC–1L operates and operates relay FL, and
2. Relay TC–2L operates and operates relay FL–1, and
3. Relay TC–1L releases and holds relay FL–1, and
4. Relay TC–2L releases and releases relay FL a similar condition results as any wheel passes over a section of the treadle switch in the reverse direction; namely, 1. Relay TC–2L operates and operates relay RL.
2. Relay TC–1L operates and operates relay RL–1.
3. Relay TC–2L releases and holds relay RL–1.
4. Relay TC–1L releases and releases relay RL.

Consequently, in the present invention if a wheel "rocks" back and forth on the treadle section, the order of relay operation will follow the manifestation of the wheel as it rocks so that the condition of the circuits will always represent the position of the wheel on the treadle section. This is true even if one or more wheels have cleared the treadle section in the initial direction of movement provided that all wheels of an axle have not cleared the treadle section. With the arrangement described and shown, if a wheel of an axle clears one section of the treadle switch and thereafter reverses over another section of the treadle switch, the circuit of the last mentioned section will operate in accordance with the movement of the wheel over that section, and if the wheels clears the treadle switch in a direction opposite to that with which initial contact was made, the treadle circuit will clear without registering an axle count (i. e. the energization of the relay RS).

For example, let it be assumed that a wheel passes over section L in the forward direction and then reverses over section M. The following circuit conditions will ensue:

1. Relay TC–1L operates and operates relay FL.
2. Relay TC–2L operates and operates relay FL–1.
3. Relay TC–1L releases and holds relay FL–1.
4. Relay TC–2L releases and releases relay FL.

After the wheel reverses:

1. Relay TC–2M operates and operates relay RM.
2. Relay TC–1M operates and operates relay RM–1.
3. Relay TC–2M releases and holds relay RM–1.
4. Relay TC–1M releases and releases relay RM.

Since relays RL, FL, RM, FM, RR, and FR are all released, and the relays FL–1 and RM–1 operated under such conditions, a circuit will be established to operate relay CR, thereby releasing relays FL–1 and RM–1 without energizing the counter magnet FCC; consequently, all the circuits and circuit components will be restored to normal without erroneously counting an axle. The circuit which is thus established is as follows: 40 volt positive supply line, contacts FR–a, contacts RR–a, contacts FM–a, contacts RM–a, contacts FL–a, contacts RL–a, contacts FL–1–e, contacts RM–1–f, relay CR, ground to 40 volt negative supply line. Similar resulting clearances of the circuits and components occur where a wheel enters over another section and reverses over still another section.

It is to be noted that the novelty of the circuit arrangement results from the requirement that at least two (2) of the sections circuits must be completed, and the treadle switch cleared, before any axle count is effected by the counter magnet. Consequently, not only the features relative to reversing of the movement of the wheels are achieved by the unique arrangement, but also erroneous counting of axles due to one wheel crossing the treadle switch before the other is eliminated.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A vehicle registering device comprising a plurality of treadle switches disposed laterally to one another and transversely to the path of the vehicle to be registered, in such a manner that each wheel of a vehicle axle can pass over a different one of said treadle switches, the said switches being adapted to be operated by the passage of the wheels of a common axle thereover and further arranged so that more than one switch can be operated at the same time by the same axle, each said switch including a first pair of contacts and a second pair of contacts, the normal actuation of the said contacts as a switch is operated being the first pair closed alone, both pairs closed, the second pair closed alone, both pairs open, a first interlocking circuit for each said switch established when both said pairs are closed, a second interlocking circuit for each said switch established when the said second pair remains closed alone after the said first pair has opened, a third interlocking circuit for each said switch established when the closing of the said first pair remains closed alone after the said second pair has opened, a counting circuit, circuit connections established by the closing of the first two of said interlocking circuits of at least two said switches for energizing the said counting circuit when the wheels of an axle pass normally over the said switches, a reverse counting circuit, and circuit connections established by the said third interlocking circuit of at least two said switches for energizing the said reverse counting circuit when the wheels of an axle pass reversely over the said switches.

2. A vehicle registering apparatus comprising a plurality of treadles disposed laterally one to the other and transversely to the path of the vehicle to be registered, in such a manner that each wheel of an axle of a vehicle must pass over a different one of said treadles; a plurality of forward relays each having contacts governed thereby, and each forward relay being controlled by a different one of said treadles so as to be rendered operated in response to a wheel passing over the controlling one of said treadles in a forward direction; a control relay having contacts governed thereby; an electrical circuit including said contacts governed by said forward relays, for completing a circuit to said control relay consequent upon the operation of more than one of said forward relays; and a vehicle registering device controlled by said contacts governed by said control relay to effect a registration in response to the operation of said control relay.

3. A vehicle registering apparatus according to claim 2 additionally comprising a plurality of reverse relays each having contacts governed thereby, and each being controlled by a different one of said treadles so as to be rendered operated in response to a wheel passing over the controlling one of said treadles in a reverse direction; and another electrical circuit including said contacts governed by said reverse relays, for completing a circuit to said control relay consequent upon the operation of more than one of said reverse relays.

4. A vehicle registering apparatus comprising a plurality of treadles disposed laterally one to the other and transversely to the path of the vehicle to be registered, in such a manner that each wheel of an axle of a vehicle must pass over a different one of said treadles; a plurality of forward relays each having contacts governed thereby, and each forward relay being controlled by a different one of said treadles so as to be rendered operated in response to a wheel passing over the controlling one of said treadles in a forward direction; a plurality of reverse relays each having contacts governed thereby, and each reverse relay being controlled by a different one of said treadles so as to be rendered operated in response to a wheel passing over the controlling one of said treadles in a reverse direction; a control relay having contacts governed thereby; an electrical circuit including said contacts governed by said forward relays for completing a circuit to said control relay, said electrical circuit being conditioned for completion consequent upon the operation of any one of said forward relays and being completed consequent upon the operation of more than one of said forward relays; and means controlled by said contacts governed by said reverse relays when any one of said reverse relays is operated, for resetting said electrical circuit conditioned for completion.

5. A vehicle registering apparatus according to claim 4 additionally comprising another electrical circuit including said contacts governed by said reverse relays for completing a circuit to said control relay, said another electrical circuit being conditioned for completion consequent upon the operation of any one of said reverse relays and being completed consequent upon the operation of more than one of said reverse relays; and means controlled by said contacts governed by said forward relays when any one of said forward relays is operated, for resetting said another electrical circuit conditioned for completion.

6. A vehicle registering apparatus according to claim 5 additionally comprising a vehicle registering device controlled by said contacts governed by said control relays to effect a registration in response to the operation of said control relay.

References Cited in the file of this patent

UNITED STATES PATENTS

| | | |
|---|---|---|
| 2,186,922 | Hampton et al. | Jan. 9, 1940 |
| 2,268,925 | Cooper | Jan. 6, 1942 |
| 2,311,359 | Barker | Feb. 16, 1943 |
| 2,483,394 | Barker | Oct. 4, 1949 |
| 2,525,824 | Nagel | Oct. 17, 1950 |
| 2,551,977 | Smith | May 8, 1951 |
| 2,603,419 | Barker et al. | July 15, 1952 |